(12) United States Patent
Gallagher

(10) Patent No.: US 6,796,788 B2
(45) Date of Patent: Sep. 28, 2004

(54) CARRIER TRANSFER MOLDING DEVICE

(76) Inventor: Robert M. Gallagher, 1204 Waterford Rd., West Chester, PA (US) 19380-5814

( * ) Notice: Subject to any disclaimer, the term of this patent is extended or adjusted under 35 U.S.C. 154(b) by 483 days.

(21) Appl. No.: 09/867,974

(22) Filed: May 30, 2001

(65) Prior Publication Data

US 2002/0182283 A1 Dec. 5, 2002

(51) Int. Cl.⁷ .............................................. B29C 43/34
(52) U.S. Cl. ....................... 425/574; 425/257; 425/258; 425/448; 425/449; 141/233; 198/463.2; 198/463.3; 222/355
(58) Field of Search ................................ 141/231, 232, 141/233; 198/463.2, 463.3; 222/344, 355; 425/574, 448, 449, 375, 129.1, 258, 112, 117, 126.1, 377, 376.1, 404, 575, 257; 264/308, 320, 211.12

(56) References Cited

U.S. PATENT DOCUMENTS

| | | | | |
|---|---|---|---|---|
| 3,473,204 A | | 10/1969 | Lanuzzi et al. ............. 425/449 |
| 3,877,862 A | | 4/1975 | Murray ........................ 425/448 |
| 4,418,446 A | * | 12/1983 | Sandberg et al. ........... 425/574 |
| 4,971,544 A | | 11/1990 | Schneeberger .............. 425/258 |
| 5,006,188 A | | 4/1991 | Usui et al. .................. 156/245 |
| 5,078,937 A | | 1/1992 | Eela ............................ 264/109 |
| 5,185,117 A | | 2/1993 | Hawley ................. 264/211.12 |
| 5,304,050 A | * | 4/1994 | Vismara ...................... 425/4 R |
| 5,326,523 A | | 7/1994 | Gustavel et al. ............ 264/257 |
| 5,354,526 A | | 10/1994 | Jost et al. ................... 264/40.4 |
| 5,364,258 A | * | 11/1994 | Buckley et al. .............. 425/501 |
| 5,389,315 A | | 2/1995 | Yabushita ................... 264/40.1 |
| 5,401,154 A | | 3/1995 | Sargent ....................... 425/114 |
| 5,427,518 A | * | 6/1995 | Morizot et al. .............. 425/504 |
| 5,462,422 A | | 10/1995 | Gustavel et al. .......... 425/129.1 |
| 5,518,669 A | | 5/1996 | Kilsdonk .................... 264/1.24 |
| 5,558,883 A | * | 9/1996 | Shinada et al. .............. 425/116 |
| 5,585,122 A | | 12/1996 | Drum et al. ................. 425/182 |
| 5,672,403 A | | 9/1997 | Hara et al. ...................... 428/95 |
| 5,686,117 A | | 11/1997 | Snyder et al. ............... 425/112 |
| 5,788,901 A | | 8/1998 | Barnard et al. .............. 264/165 |
| 5,798,128 A | | 8/1998 | Dumazet et al. ............ 425/147 |
| 5,849,137 A | | 12/1998 | Hogge et al. ............... 156/500 |
| 6,264,462 B1 | * | 7/2001 | Gallagher .................... 425/574 |
| 6,270,331 B1 | * | 8/2001 | Oono et al. ................. 425/112 |
| 6,280,785 B1 | * | 8/2001 | Yang et al. .................. 426/231 |

* cited by examiner

*Primary Examiner*—Joseph Drodge
*Assistant Examiner*—Emmanuel S. Luk
(74) *Attorney, Agent, or Firm*—Dykema Gossett PLLC

(57) ABSTRACT

A polymer is plasticized in a plasticizing unit and is thereafter fed into a transfer device which is moved into alignment with a clamping press which is remotely located from the plasticizing unit. The polymer from the transfer device is deposited on a carrier which moves into the forming device. An impress preforming device allows the carrier with the deposited polymer to be shaped in the mold or forming device. Alternatively, the transfer device can be connected with a chamber which is capable of coating continuous or chopped fibers which are deposited on a carrier in a continuous or chopped manner. The carrier with the fiber and polymer composite layer are shaped in the forming device.

25 Claims, 7 Drawing Sheets

CARRIER TRANSFER MOLDING DEVICE

FIELD OF INVENTION

This invention relates to a polymer transfer and deposition system and to a carrier transfer molding system where a carrier of a generally planar shape passes below a polymer deposition device where polymer is deposited on the carrier with the combined carrier and polymer moving to a forming device to produce an article of a desired shape. When more than one layer of polymer is deposited on the carrier, an insert is placed between the polymer layers. A surface layer is laminated to the top layer of polymer prior to moving into a forming device.

CROSS REFERENCE TO RELATED APPLICATIONS

This invention refers to a transport and deposition device and method as described in U.S. patent application Ser. No. 09/388,052 filed on Sep. 1, 1999, now U.S. Pat. No. 6,264,462. issued Jul. 24, 2001.

BACKGROUND OF INVENTION

This invention relates to a system including a combined carrier and deposited polymer that move into a forming device to produce an article of a desired shape. The carrier may collect more than one deposit or layer of polymer where an insert such as a rigid foam or honeycomb core is encapsulated by the polymer layers. Additionally, continuous strands of fiber reinforcement may be incorporated in the polymer phase. The carrier, as an example, is a film, foil, fiber construction or other support of a generally planar shape. The carrier provides a decorative surface in the finished shape, outdoor ultra-violet (UV) protection, fire retardency, improved chemical and permeation resistance, improved impact properties or just provides a sacrificial mechanism to move a deposited polymer into a forming device. Although a thermoset can be specified as the deposited polymer, a molten thermoplastic is the preferred choice. A method to deposit polymer onto a carrier in close proximity to one or more forming devices, to minimize heat loss time prior to forming the desired part, is described in my copending U.S. patent application, Ser. No. 09/388,052, now U.S. Pat. No. 6,264,462. The same disclosure describes a method to incorporate continuous fibers in the polymer composition.

Although the carrier process or method can produce a wide variety of sizes and shapes, the processing advantages become more apparent as the size of the finished part increases, typically in excess of one square meter. A prime thermosetting method used to produce large polymer composites utilizes cross-linking liquid resins to impregnate reinforcements under low pressures, either within a mixing head or pumping the liquid into a fiber preform. The combined composite solidifies as the liquid polymer crosslinks. Large thermoplastic composites can be produced under low pressure by a softening a plastic sheet, then pulling a vacuum under a forming shape. These low pressure processes are generally used where production volumes are lower because of the lower productivity associated with these technologies. Injection molding was designed for high volume production of polymer shapes. However, the process requires higher molding pressures. For large parts, these pressure requirements can be substantial. The increasing equipment costs associated with the need to meet increased pressures has limited the use of injection molding in the production of large parts.

The polymer deposited on a carrier generally occupies or fills out a large area of the forming dies in a forming press, plus the pre-coating of the carrier by a deposited polymer, leads to a reduction in trapped gases between the carrier and the polymer. Because the polymer flows less within a forming device when compared to injection molding, the pressure requirements needed to produce an article with a finished shape are less than required with an injection molding machine. This reduced pressure allows pressure sensitive surface materials and cores to be incorporated in the finished composite shape without damage. The processing cycle of the carrier deposited polymer process is similar to an injection molding cycle based on the similar cooling times and distribution of polymer within the forming device. The carrier transfer lower pressure process combines the productivity and processing characteristics of injection molding with the ability to customize the desired finished surface; incorporate cores to improve stiffness, acoustic and insulation properties, and allow selective placement of continuous reinforcement to increase the stiffness and strength of the composite.

SUMMARY OF THE INVENTION

The present invention addresses a need in the art by providing a combined polymer matrix where the surface characteristics of the product can be customized, cores can be incorporated and, where needed, reinforcement impregnation to produce a whole new range of useful properties. A carrier, typically in a planar shape, passes below a polymer deposition device where a uniform layer of molten polymer is deposited on the carrier in close proximity to a forming device. The combined materials move into an opening in the forming device where the forming device closes on the materials to form the desired shape.

The carrier moves under a polymer deposition device that contains a predetermined amount of molten polymer based on the size of the deposition chamber. A ram within the chamber pushes the molten polymer out of an opening in the bottom of the chamber where the size and shape of the opening determines the deposited thickness, together with the speed of the ram and carrier. The molten polymer may be polypropylene, high density polyethylene, polyester, thermoplastic olefin or any other desired thermoplastic. The carrier can be low cost non-wovens such as spunbonded polyester and polyolefin or felt; a combination of a film and non-woven or foam; a fluoropolymer film such as Fluronated Ethylene Propylene (FEP) to improve fuel and gas permeation resistance or polyvinyl fluoride for fire retardency and UV resistance; a pre-printed film or a coated film to change the surface characteristics in the finished part or any other desired surface. The combined materials index in a straight line fashion into the forming press where the carrier is separated from a series of side clamps that support the carrier during the deposition and movement phase. Alternately, an undercarriage that holds the carrier in position during polymer deposition and movement into the forming device can support the carrier. A vacuum or clamps incorporated in the undercarriage would hold the carrier and deposited layer or layers of polymer during movement into the forming device, then disengage prior to removal of the undercarriage from the carrier and closing of the forming device. Outboard clamps located on opposite sides of the forming press and outside of the shaping molds would hold and position the combined carrier and deposited polymer as the forming device closed to produce the desired shape. Preferably, the undercarriage would be an insulator and have low surface friction characteristics.

In a second aspect, the carrier moves under the polymer deposition device in a direction away from the forming device as polymer is deposited on the carrier. Once clear of the deposition device, a multi-axis robot positions an insert on top of the deposited polymer layer. The carrier reverses direction, again passing under the polymer deposition device where a second coating or layer of polymer is deposited over the insert. The combined composite moves in a straight-line direction into the forming device to form a desired shape. The insert can be rigid foam, honeycomb, balsa or any other desired construction.

Alternately, two polymer deposition devices can align with each other in a manner where the carrier can pass under both devices in a straight-line direction with the forming device. The carrier first passes under the deposition device furthest from the forming device, then under the second deposition device where a second layer of polymer is deposited. The combined polymers and carrier move into the forming device where the desired shape is formed. Prior to the second deposit a multi-axis robot places an insert such as rigid foam or honeycomb on top of the first deposited layer prior to applying the second coating. The composition of the polymer being deposited from each deposition chamber can be the same or of a different polymer.

Using a secondary chamber that collects molten polymer from the deposition chamber, continuous fibers, discontinuous fibers or a combination of continuous and discontinuous fibers are fed into a chamber where the fibers are encapsulated by molten polymer under pressure and downward applied motion as described in my copending U.S. patent application, Ser. No. 09/388,052, now U.S. Pat. No. 6,264,462. The combined material is deposited in generally a planar shape on the carrier and moves into the forming device to produce the desired shape.

A second surface layer can be applied to the deposited polymer prior to entering the forming device. A multi-axis robot contains a vertical holding fixture with a curved edge on the side closest to the deposited polymer. The surface layer is positioned on the fixture with the edge extending into the curved area. The robot applies downwardly acting pressure on the curved edge where the forward movement of the deposited polymer on the carrier pulls the surface layer from the robot fixture. The curved edge can incorporate a roller feature that assists the movement of the second surface layer. Alternately, drive rollers or other suitable driving devices can assist the forward movement of the second surface layer during lamination to the top of the deposited polymer melt.

A mold consisting of a cavity or concave side and a core or convex side can be attached to a vertical action-forming device such as a clamping press. The desired polymer and carrier composition would be positioned between the cavity and core where the press would close to form the product determined by the shape of the cavity and core. The carrier side can be formed over either the cavity or core. One reason for forming the carrier over the core side would be to produce a chamber with the carrier on the inside area. Two chambers with matching edges would be aligned opposite each other and fused together after softening the surfaces of the carrier edges with a source of heat generation directed at the area to be fused. A set of holding fixtures would move the two mating half's together under pressure to insure full contact at the bond line. The resulting part would be a hollow device such as a liquid container. Interior and exterior required details would be incorporated in either section of the parts. The use of a fluoropolymer construction as the carrier would provide improved chemical and permeation resistance through the inside walls of the container. A specific example would be a plastic fuel tank with molded-in attachment features and low fuel vapor permeation.

Any of the various carrier and polymer combinations can be incorporated together to form a specific finished article or part. For example, the carrier can provide a decorative surface with the deposited polymer adding structure. The incorporation of a core such as rigid foam between polymer layers can increase the stiffness, insulation properties or other desirable characteristic in the combined composite. Continuous fiber reinforcement in one or both polymer deposits would increase the stiffness and strength of the composite.

DETAILED DESCRIPTION OF THE PREFERRED EMBODIMENT

Figure 1:
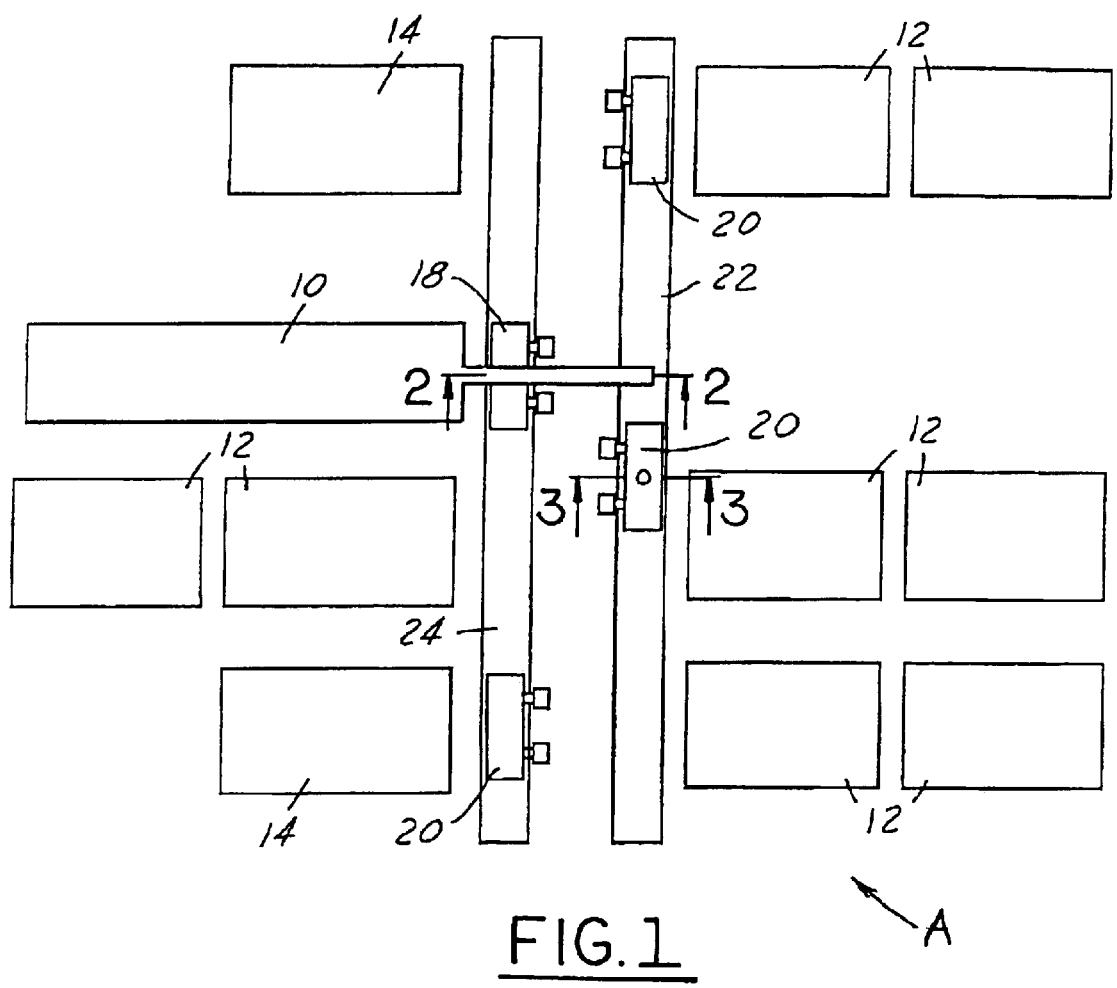
FIG. 1 is a schematic top view of the components that made up the transfer deposition device.

Referring now to FIG. 1, where the polymer transfer and deposition device is designated by the letter A. It includes plasticating machine or extruder 10 shown with remotely located combinations of multiple or a plurality of clamp stations 12 and a plurality of single site clamping stations 14. A dual outlet polymer distribution manifold 16 with shut off controls 28 for each outlet 30 is attached to the plasticating machine 10 while depositing the plasticized polymer into the chamber of a transport device 18. Additional transport devices 20 are positioned in front of the clamping stations 12 and 14 for returning to the manifold 16 polymer dispensing outlet. The transport device guide or conveyor 22 handles the outer transport movement while transport device guide or conveyor 24 controls the inner transport movement.

Figure 10:
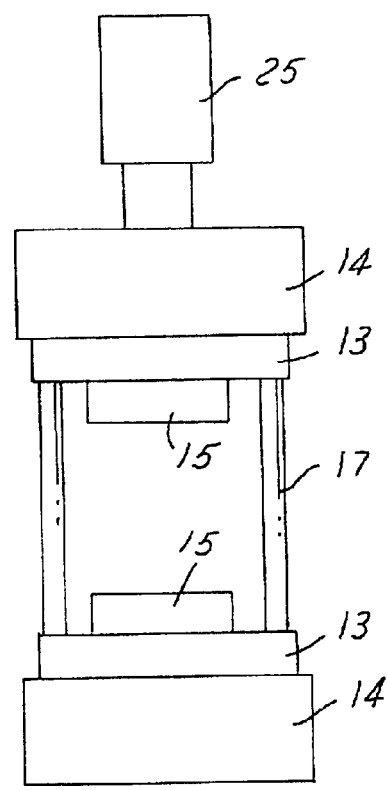
FIG. 10 is a schematic view of a forming device or a vertical acting clamping press containing upper and lower sections.

The arrangement or layout of the clamping stations 12 and 14 are for illustrations purposes. As shown in FIG. 10, each vertical acting clamping station 14 includes mold sections 15 which are attached to vertically spaced apart platens 13 constituting a forming device. A fluid cylinder or actuator 25 is attached to the upper platen 13 for moving the platen 13 up and down on the guides 17. The size and number of stations can be adjusted to meet a specific requirement.

Figure 3:
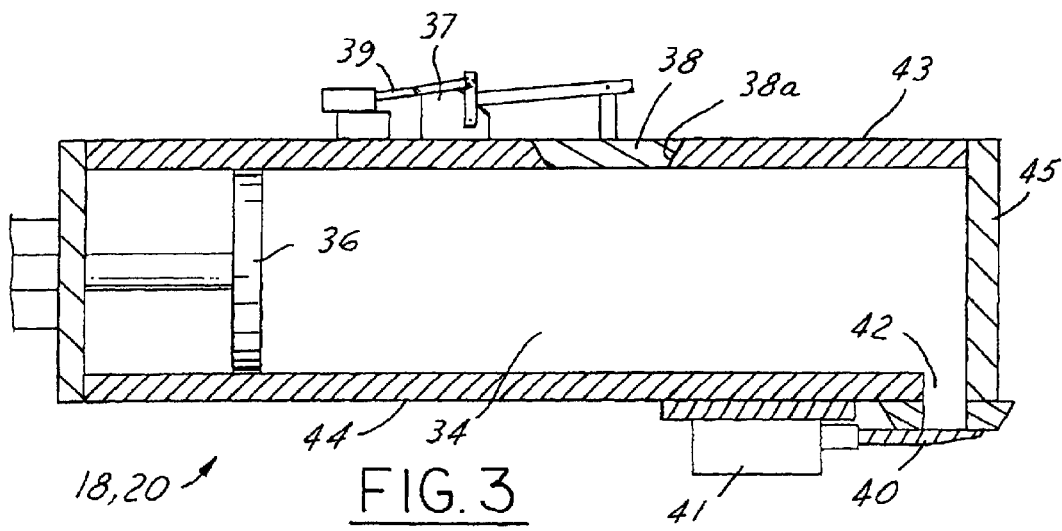
FIG. 3 is a cross-sectional view of the transport device taken along line 3—3 of FIG. 1.

The four illustrated transport devices 18 and 20 of FIG. 1 are shown with the inner, bottom transport device 20 serving clamping stations 12 and 14 on the bottom left side as illustrated. The top transport device 18 handles the upper left clamping station 14 as illustrated. The two outer transport devices 20 serve the outer top and bottom clamping stations 12 respectively as illustrated in FIG. 1. One or more cylinders are attached to the transport devices 18, 20, providing the pressure to move a ram 36 located within the transport chamber 34, as shown in FIG. 3. The number of cylinders on each transport device 18, 20 depends on the size of the chamber 34. The overall dimensions of chamber 34 and the position of the ram 36 therein determine the available volume within the chamber 34. When a molten polymer is deposited in the transport chamber 34, the transport device 18, 20 is insulated and/or heated. Although not illustrated, necessary electrical, pneumatic and hydraulic components are attached to the transport device 18, 20.

Figure 2:
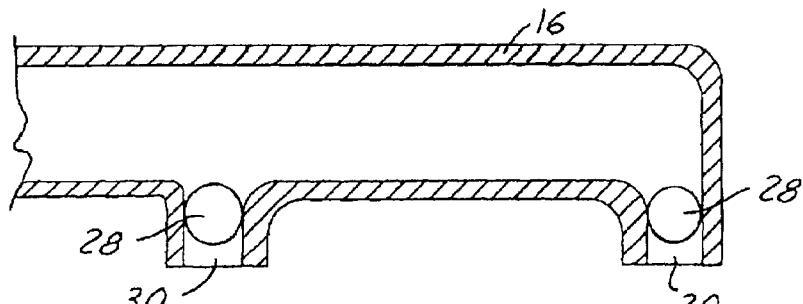
FIG. 2 is a cross-sectional view of the polymer distribution manifold taken along line 2—2 of FIG. 1.

Referring now to FIG. 2, the polymer distribution manifold 16 has two outlet ports 30 for providing a continuous discharge of the polymer, with alternating on-off shut off devices 28 located at the outlet ports 30. When the outside transport chamber 34 is collecting discharging polymer, the mating shut off device 28 is in the open position and the inner shut off device 28 is in the closed position. The shut off devices 28 are reversed when the inside transport chamber 34 is collecting polymer.

To allow polymer discharge from the dual outlet manifold 16 into chamber 34 of the transport device 18, 20, a fill port 38 is opened using a toggle lift and rotation clamp 37. As link 39 is retracted, the toggle clamp 37 lifts the port 38 and rotates it away from the opening 38a. In the close position, the toggle clamp 37 locks the fill port 38 in place in opening 38a. To discharge the polymer from the transport chamber 34, seal 40 is retracted using one or more cylinders 41, and the ram 36 pushes against the polymer within transport chamber 34, forcing the polymer out of the exit port 42.

Each movable non-rotatable and hollow transport 18, 20 has a top wall 43, a bottom wall 44 and a pair of ends walls 45. The entrance port or opening 38a is located in the top wall 43. The exit port or opening 42 is located in the bottom wall 44.

Figure 4:
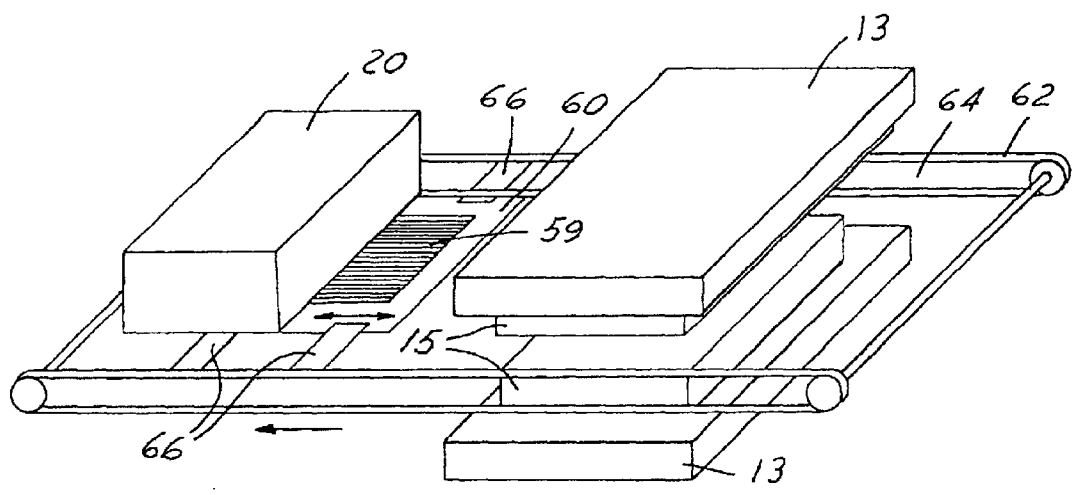
FIG. 4 is a schematic view of the preferred carrier moving below a plasticized polymer chamber where polymer is being deposited and a forming device is in line with the carrier and deposition chamber.

Referring now to FIG. 4, one transport and deposition device 20 that contains molten polymer within the chamber, deposits molten polymer 59 on a planar shaped carrier 60 under the forward movement of a ram which is located within the chamber. An opening is provided in the bottom of the transport device 20 where polymer exits from the chamber. The planar shaped carrier 60 moves under the transport and deposition device 20 as polymer 59 is deposited on the moving carrier 60. The combined deposited polymer and carrier index forward in a straight line towards a clamping device represented by the platens 13. Two conveyor side guides 64 with a plurality of clamp attachments 66 hold the carrier 60 during movement via drive roll 62. The combined deposited polymer 59 and carrier 60 index into a forming device represented by upper and lower platens 13 to which upper and lower mold sections 15 are attached. The forming device close on the combined carrier 60 and the deposited polymer 59 to produce an article of a desired shape.

Figure 5:
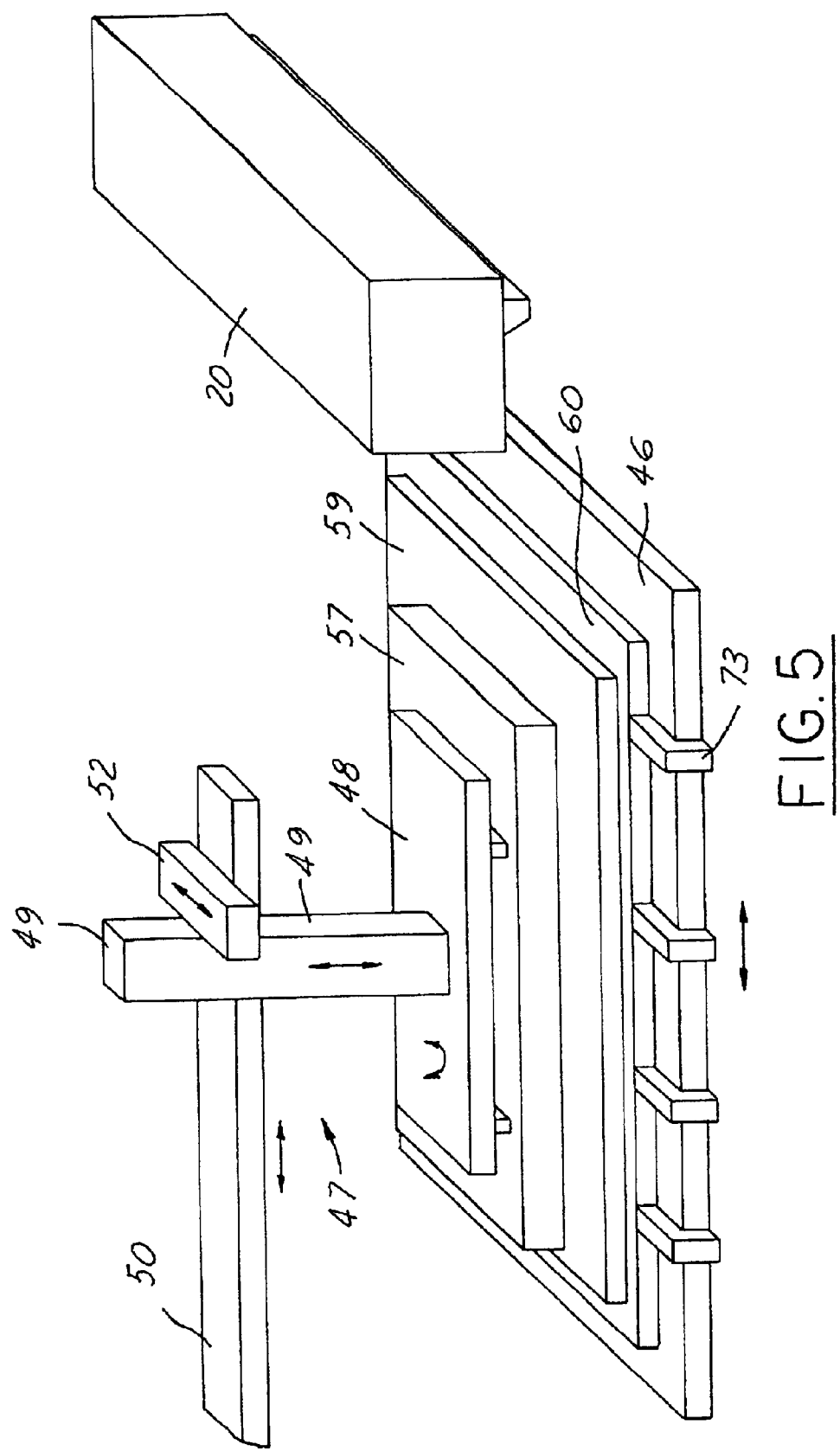
FIG. 5 is a schematic view of a multi-axis robot placing a rectangular insert on a polymer deposited carrier and a supporting undercarriage containing side clamps to hold the carrier and a deposition chamber that applies another polymer deposit when the undercarriage moves under the chamber to encapsulate the insert.

In another aspect of the preferred embodiment, the carrier 60 passes under and collects deposited polymer 59 in both directions from the transport and deposition device 20. A light-weight core 57 is placed on the first layer of deposited polymer 59 prior to reversing the direction of carrier 60. Referring now to FIG. 5, the carrier 60 is moved under the transport and deposition device 20 in a direction away from the forming device 13 as polymer 59 is deposited on carrier 60 in a manner described in FIG. 4. An undercarriage 46 supports the carrier 60 and the deposited polymer 59, holding the carrier 60 in position with edge clamps 73. The undercarriage 46 is constructed from a light weight material containing a low friction, heat resistant surface. A multi-axis robot 47 places the rectangular shaped core 57 on the deposited polymer 59 by a rotating fixture 48 attached to the vertical acting robot arm 49. Core material 57 is collected from a feed station located outside the process area (not shown) by the multi-axis robot rotating fixture 48 using vacuum cups attached to the face of the fixture 48. Arms 50 and 52 control the horizontal movements of the robot 47. The fixture 48 releases the core 57 on the deposited polymer 59 and moves away from the combined carrier 60, deposited polymer 59 and core 57. The combined materials move back under the transport device 20 and collects deposited polymer from the transport and deposition device 20 in the same manner as described in FIG. 4. The combined materials continue in a straight-line fashion into the forming device 13 to produce an article of a desired shape out of the combined carrier and polymer encapsulated core material. The undercarriage 46 retracts from the forming device 13 prior to forming a desired shape.

Figure 6:
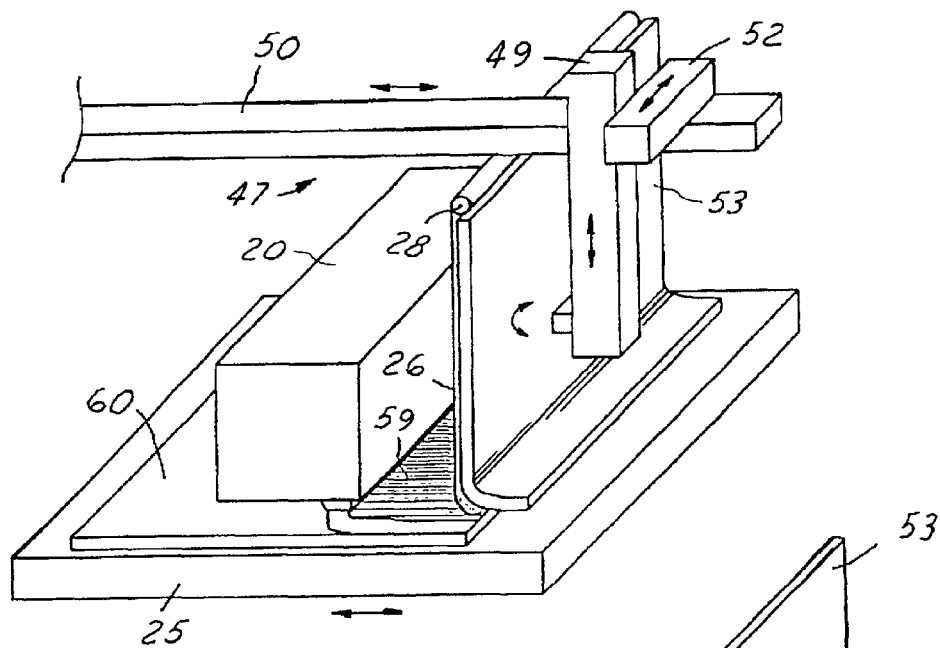
FIG. 6 is a schematic view of a robot positioned in front of a deposition chamber where a surface layer is released from the robot as a polymer deposited carrier and supporting undercarriage moves under the curved bottom section of robot guide while the robot applies pressure on the combined materials.
Figure 7:
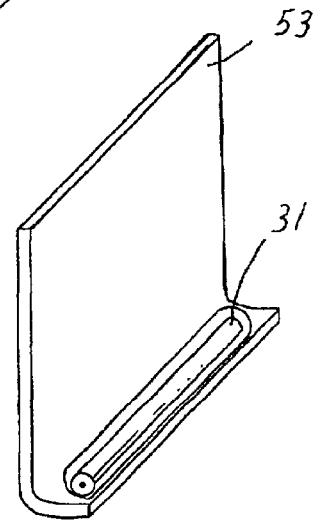
FIG. 7 is a perspective view of the robot guide of FIG. 6, with a roller located on the curved portion of the guide.

Prior to entering the forming device 13, a surface layer can be laminated to the exposed top layer of deposited polymer 59 at a position between the forming device comprising the platens 13 and the molds 15 and the transport and deposition device 20. As shown in FIG. 6, the multi-axis movement robot 47 with horizontally moving arms 50 and 52 and a vertically acting arm 49 has an attachment or robot guide 53 capable of rotating around arm 49 from a horizontal to a vertical position. The multi-axis robot 47 picks up a surface material 26 from a feed device such as a magazine (not shown) that is outside the process area. Attachment or robot guide 53 is positioned vertically with a curved lower edge or portion that guides the surface layer 26 as the combined carrier 60 and deposited polymer 59 moves under the robot guide 53. Undercarriage 46 provides horizontal movement for the combined materials under the curved edge or portion of robot guide 53. The vertical robot axis 29 applies downward acting force to improve the contact between the surface material 26 and the deposited polymer 59. Undercarriage 46 provides a counteracting force. A rotary fixture holds the surface material 26 with pneumatically operated side clamps that releases the surface material 26 at the start of the curved edge of attachment or guide 53. The interface friction between the surface material 26 and moving deposited polymer 59, together with the compressive force between the undercarriage 46 and attachment or robot guide 53, combine to move the surface material 26 at the same rate as the deposited polymer 59. Attachment or guide 53 is positioned between the transport and deposition device 20 and the forming device 13 (not shown). As an alternative to the curved edge or portion of attachment or robot guide 53, a roller 31 is attached to the curved lower edge of guide 53 as shown in FIG. 7. The roller 31 would rotate as the combined laminate moves forward.

Figure 8:
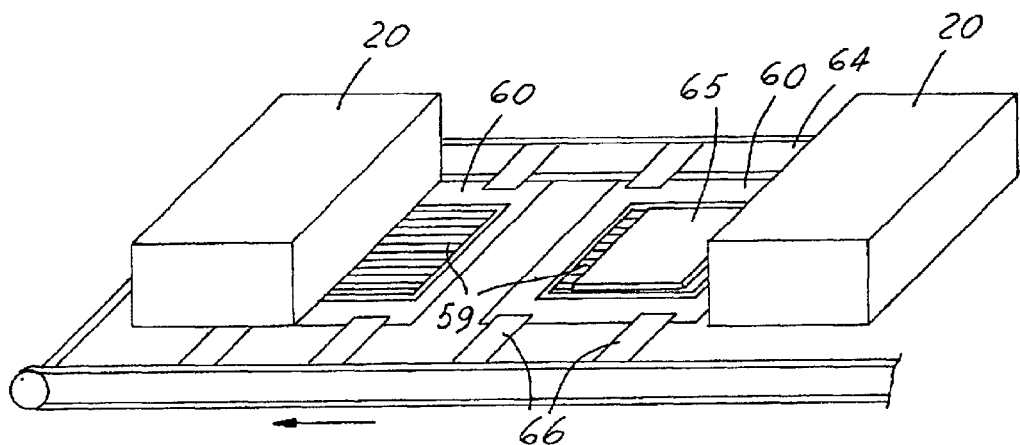
FIG. 8 is a schematic view of two deposition chamber in series with a polymer coated carrier moving under the outer chamber while a second polymer coated carrier with an insert on top moving under the inner deposition chamber where another deposited layer is applied.

Another method to provide a double layer of deposited polymer 59 on a carrier 60, two transport and deposition devices 20 are aligned in series so that carrier 60 passes under both transport and deposition devices 20 and accept deposited polymer 59. An insert 65 is placed between the first and second deposits of polymer 59. FIG. 8 shows a schematic view of two transport and deposition devices 20 with a carrier 60 passing under the outer or left device 20. Polymer 59 is deposited on carrier 60 as the carrier moves towards a second transport and deposition device 20 using outboard drives 64 attached to carrier 60 via clamps 66. An insert 65 is placed on deposited polymer 59 using a multi-axis robot 47 as shown in FIG. 5, prior to passing under the second deposition device 20 where another layer of polymer is deposited prior to indexing into the forming device. The same or different polymers 59 can be deposited from each transport and deposition device 20.

Figure 9:
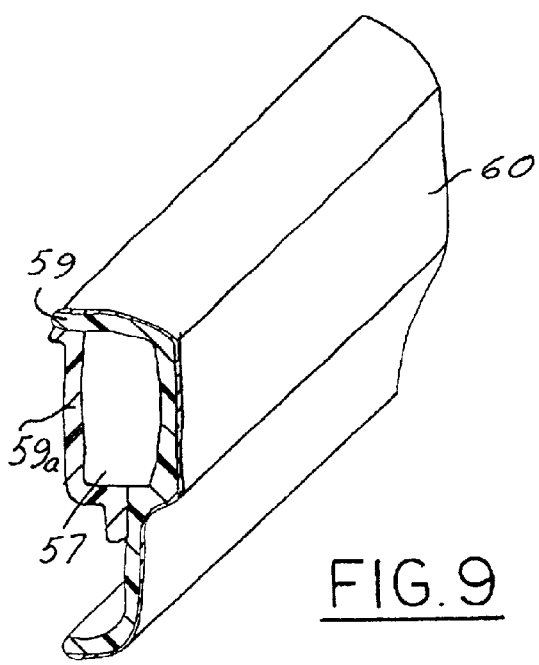
FIG. 9 is a perspective view of an automotive fascia that combines a decorative surface carrier, a polymer deposited backing, a core material and a second continuous fiber filled back layer of polymer.

To describe an application that utilizes the combination of a carrier 60, polymer 59 and an insert 57, FIG. 9 is a cut-away view of an automotive fascia and bumper combination where carrier 60 becomes a decorative outer surface. Deposited polymer 59 adheres to the carrier 60 and provides structure. A core material 57 is encapsulated by polymer 59 and acts as a beam. A continuous fiber reinforced polymer 59a makes up the back support of the composite. The process to produce continuous fiber reinforced, melt deposits is referenced in my copending U.S. patent application, Ser. No. 09/388,052, now U.S. Pat. No. 6,264,462.

In reference to a forming device represented by the platens 13, the preferred embodiment is shown in FIG. 10. The front view of the forming device consists of upper and lower platens 13 and forming molds 15 attached to the vertical supports 14. The upper portion of the forming device moves up and down on guides 17 under the forces applied by an actuator 25. The carrier 60 and deposited polymer 59 are positioned between mold sections 15. The downward action of the forming device forces the mold sections 15 to close over the combined carrier 60 and deposited polymer 59 to produce an article with the desired shape.

Figure 11:
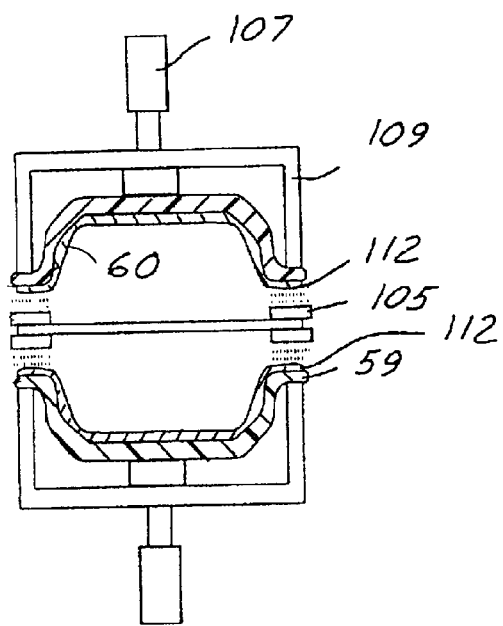
FIG. 11 is a cross-sectional view of two concave sides and carriers facing each other while in holding fixtures with external heat being applied to the edges.
Figure 12:
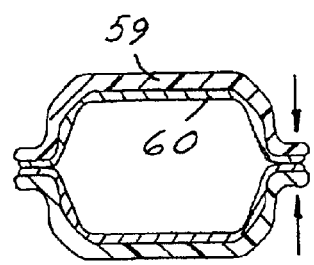
FIG. 12 is a cross-sectional view of the two sections in a sealed state.
Figure 13:
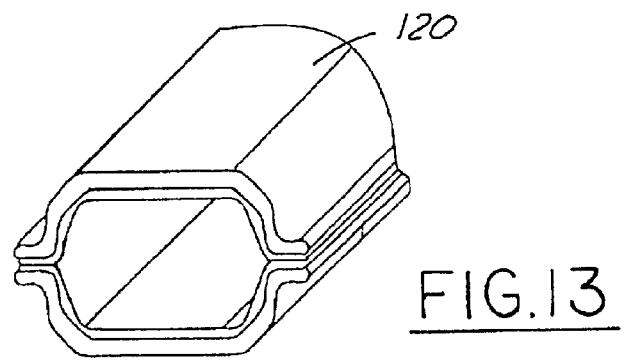
FIG. 13 is a perspective view of the sealed container, open at the end, with the carrier as the inside surface.

In another embodiment, the carrier 60 side of a composite is formed over the core or convex side of a mold half 15. The preferred carrier 60 is a fluoropolymer composition that has been treated to modify the surface of one side to improve adhesion to the deposited polymer 59. Two of the finished articles or parts, with or without the same shape, would have edges that align with each other that are fused together to form a closed container 120. FIGS. 11–13 shows the steps used to produce a sealed container 120. FIG. 11 is a cross-sectional view of holding fixtures 109 used to position two mating, concave shaped finished articles or parts that face each other with the carrier film 60 on the inside of the concave shape and the solidified deposited polymer 59 on the outside. The carrier sides 60 extend to matching flanges 112 where external infrared heat 105 is selectively applied to the flange areas to soften the carriers. Once the material has softened and can flow under pressure, the two mating edges of the carriers 60 are fused together under the pressure of actuators 107. The heat source 105 is separated from the holding fixture 109 prior to part fusion. FIG. 12 is a cross-section of the fused container 120 showing fused flanged edges. FIG. 13 is a cut-away view of the sealed container 120.

Figure 14:
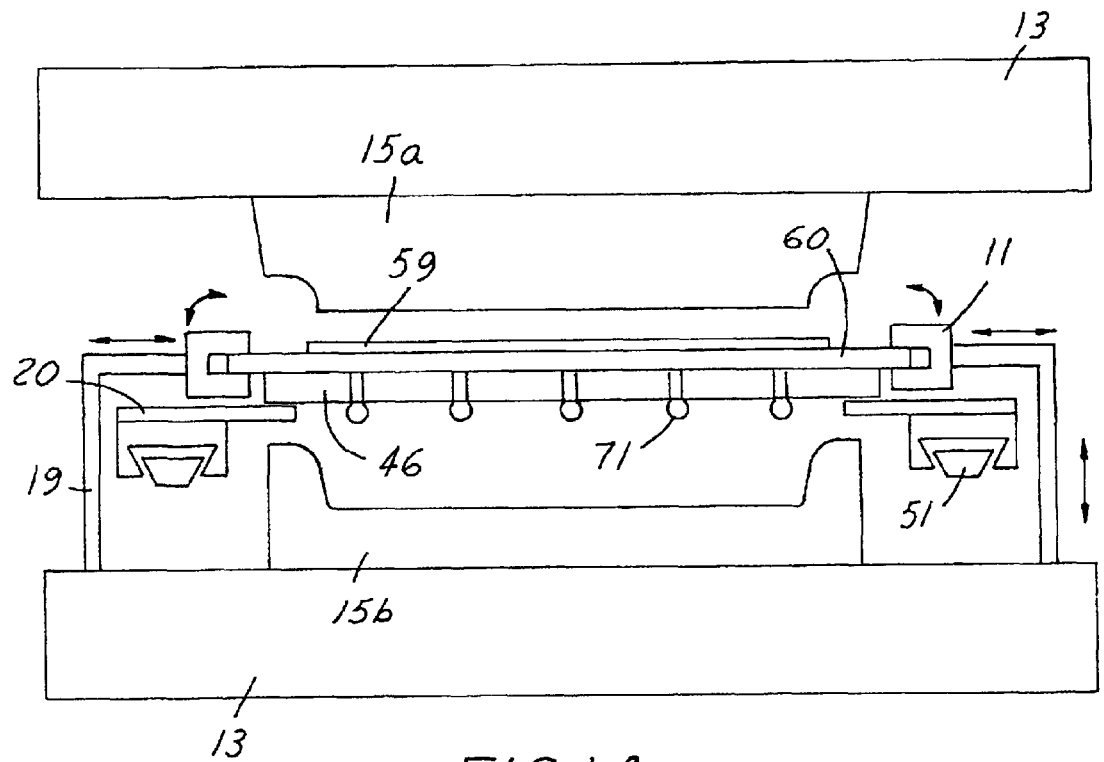
FIG. 14 is a cross-sectional view of a polymer deposited carrier being held in place by a vacuum system in the undercarriage, positioned within a forming device with a core forming section on the upper half and a cavity section on the bottom, side guides to move the undercarriage into the press and outboard clamps that position and hold the carrier over the cavity and core to allow the undercarriage to move out of the clamping device.

In reference to an undercarriage 46, FIG. 14 shows the undercarriage 46 positioned between the upper and lower half's of the mold 15 within a clamping or forming device 13. The upper mold half 15a is the core or convex side and the lower hold half 15b is the cavity or concave side. The carrier 60 has a layer of deposited polymer 59 on the top surface. The carrier 60 is held in place on the undercarriage 46 by a series of vacuum ports 71. The undercarriage 46 is supported and moves on guides 51 positioned on each side of the lower platen 13. An extender section 21 connects the undercarriage 46 with the guides 51 to allow the guides 51 to be positioned outside of the mold 15. On opposite sides of the forming device 13, pneumatic actuated grips are part of an actuator 19 that can move above the extended section 21 to grip the edges of the carrier 60 on two sides. The actuator 19 lifts the carrier 60 and deposited polymer 59 off the undercarriage 46 until the undercarriage 46 retracts from the forming press 13 after breaking the vacuum hold. The actuators 19 can lower the carrier 60 and keep the carrier 60 in tension until the closing mold half s pull the carrier 60 out of the end grips 11.

Figure 15:
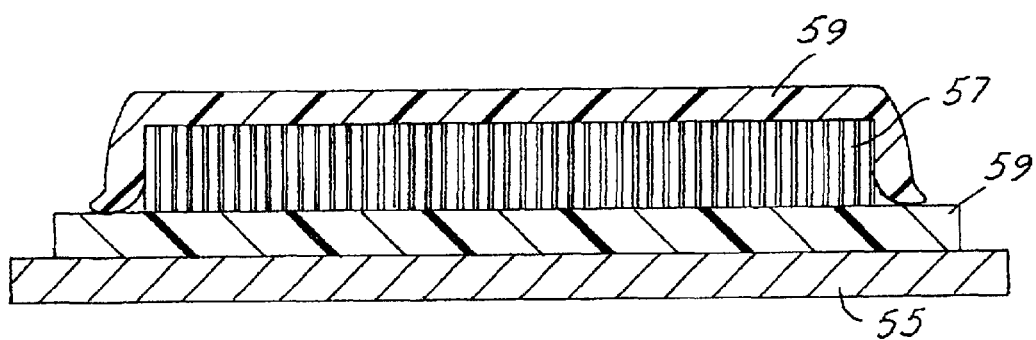
FIG. 15 is a cross-sectional view of a carrier adhering to a deposited polymer layer, a honeycomb core insert and a second layer of deposited polymer located over the insert.

FIG. 15 shows a typical cross-section of a part that incorporates features described in this invention. A honeycomb structure 57 is encapsulated on both sides by deposited polymer 59. A surface material 55 adheres to the lower deposited polymer 59. Specific desirable properties can be incorporated in the composite by modifying any of the components.

Figure 16:
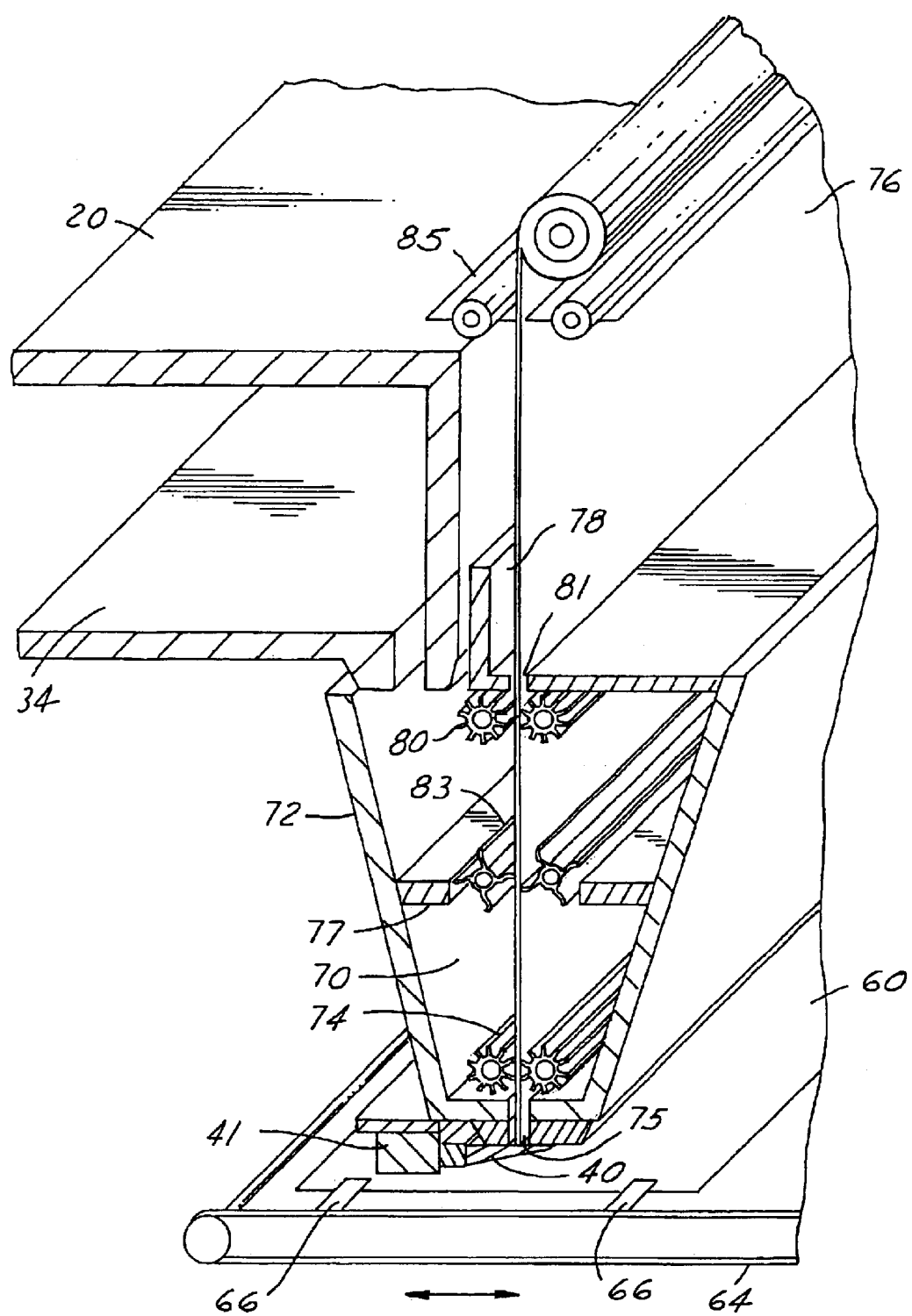
FIG. 16 is a partial cross-sectional view of the transport device inserted to a polymer collection chamber, a layer of fiber being driven into the chamber and a carrier passing below the chamber.

The polymer transfer and deposition device of FIG. 16 shows the transport device 20 aligned with the top of a polymer collection device 72. As the transport device 20 moves forward to combine with the collection device 72, a hinge 78 is pushed to open a space or chamber 70 where polymer, located in chamber 34, can be deposited into the collection chamber 72 at a controlled rate. A roll or spool of fiber 76 unwinds and moves through an opening 81 located near or on top of the polymer collection device 72.

The set of drivers 80 pull the fibers 76 into the chamber 70 at a controlled rate. The drivers 80 can move the fiber 76 in a continuous or discontinuous manner. A set of rotating impellers 83 apply inward acting force to the polymer and fibers or fiber mix. Baffles 77 are laterally spaced apart from impellers 83. Once the polymer transport device 20 has delivered a set amount of polymer, it retracts, allowing hinge 78 to close, and returns the transport device to the plasticating machine 10 where more polymer can be deposited into chamber 34. The exit position 75 of the polymer coated fiber is adjustable to control the ratio of polymer to fiber. The exit position 75 opening is controlled by seal 40 attached to one or more pistons 41. Seal 40 has a blade edge that can cut the existing polymer composite to any desired length. The existing polymer composite can be deposited on carrier 60 and moved into a clamping station. Cutters 85 chop fibers to any desirable length. The collection device 72 can be moved on a track system that is similar to the method used to guide the transport devices 18, 20 to the various clamp stations 12 and 14.

This invention described above may be modified or have changes made to it within the scope of the invention as defined by the attached claims.

What is claimed is:

1. A polymer transfer and deposition system comprising:
   a polymer plasticating machine for providing a flow of a molten polymer;
   a discharge device connected to said plasticating machine containing one or more valves to discharge the molten polymer;
   a movable non-rotatable hollow first transport and deposition device separate and independent from said plasticating machine;
   said first transport and deposition device including top and bottom walls and a pair of end walls;
   an entrance port in said top wall and an exit port in said bottom wall;
   said first transport and deposition device when said entrance port is aligned with one of said valves of said discharge device accepting the molten polymer from said plasticating machine;
   a ram located within said first transport and deposition device for moving the molten polymer toward said exit port;
   a forming device;
   a conveyor having a carrier of generally planar shape attached thereto;
   drive means for operating said conveyor and thereby moving said first transport and deposition device into alignment with said discharge device and then with said forming device;
   said drive means capable of moving said conveyor and carrier to a first position beneath the exit port of said first transport and deposition device where said ram discharges through said exit port a first layer of plasticized molten polymer which is deposited on the carrier; and
   said drive means thereafter capable of moving said conveyor and carrier with said first layer of plasticized molten polymer into said forming device which produces an article of a desired shape from the combined carrier and the first layer of plasticized polymer.

2. The polymer transfer and deposition system defined in claim 1, said system including a first robotic device wherein, prior to said conveyor moving the carrier into said forming device, said first robotic device is energized to place an insert on the first layer of plasticized polymer on the carrier;
   said conveyor again moving the carrier into a position underneath the exit port of said first transport and deposition device where, said ram discharges through said exit port a second layer of plasticized molten polymer which is deposited on the carrier over the insert and the first layer; and
   said drive means being effective to operate said conveyor to move the carrier, insert and the first and second layers of plasticized polymer into said forming device to produce an article of a desired shape.

3. The polymer transfer and deposition device defined in claim 2, wherein a second robotic device is located between said first transport and deposition device and said forming device;
   an undercarriage provided beneath the carrier to support it during the depositing of the first layer, insert and second layer of plasticized molten polymer on the carrier;
   said second robotic device having a vertically mounted robot guide having at the bottom edge thereof a curved surface located in close proximity to said undercarriage and the carrier and the first layer, insert and second layer of plasticized molten polymer;
   said robot guide carrying and supporting a surface layer of material;
   said drive means being effective to move said undercarriage with the carrier, first layer, insert and second layer of plasticized molten polymer thereon into a position underneath the curved surface of said robot guide where the surface layer of material is placed by said robot guide over the carrier, insert and layers of polymer;
   said, robot guide thereafter applying a compressive force between said undercarriage and the surface layer of material, the first layer, insert and second layer and carrier to laminate the layers and carrier together; and
   said undercarriage separating from the carrier when the carrier and laminated layers are moved by said conveyor into said forming device.

4. A polymer transfer and deposition system as defined in claim 1, wherein a second transport and deposition device, similar in construction to said first transport and deposition device is provided, said second transport and deposition device containing a plasticized molten polymer, said first transport device being aligned, spaced apart and arranged parallel to said second transport and deposition device;
   said drive means being effective to operate said conveyor and to move the carrier with the first layer of plasticized polymer thereon under the exit port of said second transport and deposition device where said ram discharges through said exit port a second layer of plasticized molten, polymer over the first layer of plasticized polymer deposited on the carrier.

5. The polymer transfer and deposition system as defined in claim 4, wherein the system includes a first robotic device which when energized places an insert on the first layer of plasticized molten polymer on the carrier prior to the second layer of plasticized molten polymer being placed on the insert and over the first layer, all prior to moving the combined carrier with the insert and deposited layers of plasticized polymer into said forming device to produce an article of a desired shape.

6. The polymer transfer and deposition device defined in claim 5, wherein a second robotic device is located between said first transport and deposition device and said forming device;
   an undercarriage provided beneath the carrier to support it during the depositing of the first layer, insert and second layer of plasticized molten polymer on the carrier;
   said second robotic device having a vertically mounted robot guide having at the bottom edge thereof a curved surface located in close proximity to said undercarriage and the carrier and the first layer, insert and second layer of plasticized molten polymer;

said robot guide carrying and supporting a surface layer of material;

said drive means being effective to move said undercarriage with the carrier, first layer, insert and second layer of plasticized molten polymer thereon into a position underneath the curved surface of said robot guide where the surface layer of material is placed by said robot guide over the carrier, insert and layers of polymer;

said robot guide thereafter applying a compressive force between said undercarriage and the surface layer of material, the first layer, insert and second layer and carrier to laminate the layers and carrier together; and said undercarriage separating from the carrier when the carrier and laminated layers are moved by said conveyor into said forming device.

7. The polymer transfer and deposition system as defined in claim 1, wherein said forming device contains a cavity or concave section on one side and a core or convex section on the opposite side where said forming device compresses the carrier and the layer of plasticized polymer into an article of a desired shape.

8. The polymer transfer and deposition system as defined in claim 7, wherein said forming device has at least two formed shapes having matching edges on the concave side when said matching edges are opposite each other, with each matching edge having the carrier side on the matching edge surface where the carrier side edges are sealed together to form a closed container.

9. The polymer transfer and deposition system as defined in claim 1, wherein an undercarriage is provided beneath the carrier to support it during the depositing of the first layer of plasticized molten polymer on the carrier, said undercarriage separating from the carrier when the carrier and first layer of plasticized polymer enters said forming device to produce an article of a desired shape.

10. The polymer transfer and deposition system as defined in claim 9, wherein said undercarriage holds the carrier via a vacuum, with the vacuum being discontinued prior to forming an article of a desired shape in said forming device.

11. The polymer transfer and deposition system as defined in claim 9, wherein said undercarriage holds the carrier with clamps, said clamps separating from the carrier and the first layer of plasticized polymer prior to forming an article of a desired shape in said forming device.

12. A polymer transfer and deposition system comprising:
a polymer plasticating machine for providing a flow of a molten polymer;
a discharge device connected to said plasticating machine containing one or more valves to discharge the molten polymer;
a movable non-rotatable hollow first transport and deposition device separate and independent from said plasticating machine;
said first transport and deposition device including top and bottom walls and a pair of end walls;
an entrance port in said top wall and an exit port in said bottom wall;
said first transport and deposition device when said entrance port is aligned with one of said valves of said discharge device accepting the molten polymer from said plasticating machine;
a ram located within said first transport and deposition device for moving the molten polymer toward said exit port;
a forming device;
a conveyor having a carrier of generally planar shape attached thereto, with the carrier being made from a ployolefin or polyester material of non-woven construction with a weight of at least 0.75 oz./square yard;
drive means for operating said conveyor and thereby moving said first transport and deposition device into alignment with said discharge device and then with said forming device;
said drive means moving said conveyor and carrier to a first position beneath the exit port of said first transport and deposition device where said ram discharges through said exit port a first layer of plasticized molten polymer which is deposited on and adheres to the carrier; and
said drive means thereafter capable of moving said conveyor and carrier with said first layer of plasticized molten polymer into said forming device, with the carrier forming the finish surface of the article produced in said forming device.

13. The polymer transfer and deposition system defined in claim 12, said system including a first robotic device wherein, prior to said conveyor moving the carrier into said forming device, said robotic device is energized to place an insert on the first layer of plasticized polymer on the carrier;
said conveyor again moving the carrier into a position underneath the exit port of said first transport and deposition device where said ram discharges through said exit port a second layer of plasticized molten polymer which is deposited on the carrier over the insert and the first layer; and
said drive means being effective to operate said conveyor to move the carrier, insert and the first and second layers of plasticized polymer into said forming device to produce an article of a desired shape.

14. A polymer transfer and deposition system as defined in claim 12, wherein a second transport and deposition device, similar in construction to said first transport and deposition device is provided, said second transport and deposition device containing a plasticized molten polymer which is different in polymer composition than the polymer in said first transport and deposition device, said first transport and deposition device being aligned, spaced apart and arranged parallel to said second transport and deposition device;
said drive means being effective to operate said conveyor and to move the carrier with the first layer of plasticized polymer thereon under the exit port of said second transport and deposition device to place a second layer of plasticized molten polymer over the first layer of plasticized polymer deposited on the carrier.

15. The polymer transfer and deposition system as defined in claim 14, wherein the system includes a first robotic device which places an insert made from a rigid foam material on the first layer of plasticized molten polymer on the carrier prior to the second layer of plasticized molten polymer being placed on the insert and over the first layer where the insert is encapsulated by the first and second layers, all prior to moving the combined carrier with the insert and, deposited layers of plasticized polymer into said forming device to produce an article of a desired shape.

16. The polymer transfer and deposition system as defined in claim 12, wherein said forming device contains a cavity or concave section on one side and a core or convex section on the opposite side where said forming device compresses the carrier and the layer of plasticized polymer into an article of a desired shape.

17. The polymer transfer and deposition system as defined in claim 12, wherein an undercarriage is provided beneath the carrier to support it during the depositing of the first layer of plasticized molten polymer on the carrier, said undercarriage separating from the carrier when the carrier and first layer of plasticized polymer enters said forming device to produce an article of a desired shape.

18. A polymer transfer and deposition system comprising:
   a polymer plasticating machine for providing a flow of a molten polymer;
   a discharge device connected to said plasticating machine containing one or more valves to discharge the molten polymer;
   a movable non-rotatable hollow first transport and deposition device separate and independent from said plasticating machine;
   said first transport and deposition device including top and bottom walls and a pair of end walls;
   an entrance port in said top wall and an exit port in said bottom wall;
   said first transport and deposition device when said entrance port is aligned with one of said valves of said discharge device accepting the molten polymer from said plasticating machine;
   a ram located within said first transport and deposition device for moving the molten polymer toward said exit port;
   a forming device;
   a conveyor having a carrier of generally planar shape attached, thereto, with the carrier being made from material taken from the group including a fluoropolymer film, a coated film, and a pre-printed film to provide a specific surface characteristic in the article to be formed in said forming device;
   drive means for operating said conveyor and thereby moving said first transport and deposition device into alignment with said discharge device and then with said forming device;
   said drive means capable of moving said conveyor and carrier to a first position beneath the exit port of said first transport and deposition device where said ram discharges through said exit port a first layer of plasticized molten polymer which is deposited on and adheres to the carrier; and
   said drive means thereafter capable of moving said conveyor and carrier with said first layer of plasticized molten polymer into said forming device which produces an article of a desired shape from the combined carrier and the first layer of plasticized polymer.

19. The polymer transfer and deposition system defined in claim 18, said system including a first robotic device wherein, prior to said conveyor moving the carrier into said forming device, said first robotic device is energized to place an insert made from a material taken from the group including rigid foam, open wall or honeycomb core construction on the first layer of plasticized polymer on the carrier;
   said conveyor again moving the carrier into a position underneath the exit port of said first transport and deposition device where said ram discharges through said exit port a second layer of plasticized molten polymer which is deposited on the carrier over the insert and the first layer; and
   said drive means being effective to operate said conveyor to move the carrier, insert and the first and second layers of plasticized polymer into said forming device to produce an article of a desired shape.

20. The polymer transfer and deposition device defined in claim 19, wherein a second robotic device is located between said first transport and deposition device and said forming device;
   an undercarriage provided beneath the carrier to support it during the depositing of the first layer, insert and second layer of plasticized molten polymer on the carrier;
   said second robotic device having a vertically mounted robot guide having at the bottom edge thereof a curved surface located in close proximity to said undercarriage and the carrier and the first layer, insert and second layer of plasticized molten polymer;
   said robot guide carrying and supporting a surface layer of material;
   said drive means being effective to move said undercarriage with the carrier, first layer, insert and second layer of plasticized molten polymer thereon into a position underneath the curved surface of said robot guide where the surface layer of material is placed by said robot guide over the carrier, insert and layers of polymer;
   said robot guide thereafter applying a compressive force between said undercarriage and the surface layer of material, the first layer, insert and second layer and carrier to laminate the layers and carrier together;
   said undercarriage separating from the carrier when the carrier and laminated layers are moved by said conveyor into said forming device.

21. A polymer transfer and deposition system as defined in claim 18, wherein a second transport and deposition device, similar in construction to said first transport and deposition device is provided, said second transport and deposition device containing a plasticized molten polymer, said first transport and deposition device being aligned, spaced apart and arranged parallel to said second transport and deposition device;
   said drive means being effective to operate said conveyor and to move the carrier with the first layer of plasticized polymer thereon under the exit port of said second transport and deposition device to place a second layer of plasticized molten polymer over the first layer of plasticized polymer deposited on the carrier.

22. The polymer transfer and deposition system as defined in claim 21, wherein the system includes a robotic device which places an insert made from a material taken from the group including rigid foam, open wall or honeycomb core construction on the first layer of plasticized molten polymer on the carrier prior to the second layer of plasticized polymer being placed on the insert and over the first layer where the insert is encapsulated by the first and second layers, all prior to moving the combined carrier with the insert and deposited layers of plasticized polymer into said forming device to produce an article of a desired shape.

23. The polymer transfer and deposition system as defined in claim 18, wherein said forming device contains a cavity or concave section on one side and a core or convex section on the opposite side where said forming device compresses the carrier and the layer of plasticized polymer into an article of a desired shape.

24. The polymer transfer and deposition system as defined in claim 23, wherein said forming device has at least two formed shapes having matching edges on the concave side when said matching edges are opposite each other, with each matching edge having the carrier side on the matching edge surface where the carrier side edges are sealed together to form a closed container.

25. The polymer transfer and deposition system as defined in claim 18, wherein an undercarriage is provided beneath the carrier to support it during the depositing of the first layer of plasticized molten polymer on the carrier, said undercarriage separating from the carrier when the carrier and first layer of plasticized polymer enters said forming device to produce an article of a desired shape.

* * * * *